United States Patent [19]
Jenkins et al.

[11] Patent Number: 5,143,984
[45] Date of Patent: Sep. 1, 1992

[54] PROCESS TO PREPARE HIGH MOLECULE WEIGHT POLYESTER

[75] Inventors: Waylon L. Jenkins, Kingsport; Gerry Rhodes, Gray; Mark Rule, Kingsport, all of Tenn.

[73] Assignee: Eastman Kodak Company, Rochester, N.Y.

[21] Appl. No.: 822,797

[22] Filed: Jan. 21, 1992

[51] Int. Cl.$^5$ ............................................. C08F 20/20
[52] U.S. Cl. .................... 525/437; 528/272; 528/279; 528/283; 528/307; 528/308; 528/308.6; 524/175; 524/266; 524/730; 524/783
[58] Field of Search ............... 525/437; 528/272, 279, 528/283, 307, 308, 308.6; 524/175, 266, 730, 783

[56] References Cited

U.S. PATENT DOCUMENTS

| | | | |
|---|---|---|---|
| 3,066,116 | 11/1962 | Schiller et al. | 526/70 |
| 3,876,608 | 4/1975 | Anderson et al. | 523/214 |
| 4,282,137 | 8/1981 | Kohler et al. | 524/450 |
| 4,391,971 | 7/1983 | Massey et al. | 528/481 |

*Primary Examiner*—Samuel A. Acquah
*Attorney, Agent, or Firm*—Charles R. Martin; William P. Heath, Jr.

[57] ABSTRACT

A process for preparing a polyester having an inherent viscosity of at least 0.5 comprising
  (A) preparing an admixture of a molten polyester having an inherent viscosity of less than 0.5, a titanium alkoxide and a 13X zeolite, and
  (B) subjecting the admixture to a time and temperature sufficient to increase the inherent viscosity of the polyester to at least 0.5.

6 Claims, No Drawings

PROCESS TO PREPARE HIGH MOLECULE WEIGHT POLYESTER

This invention relates to a process for preparing a polyester using a titanium alkoxide and a 13x zeolite.

Polyesters, such as poly(ethylene terephthalate), poly(butylene terephthalate), and poly(butylene adipate), are well known items of commerce. They possess a number of useful physical properties which make them valuable for preparation of fibers, molded articles and film.

The properties of these polyesters are highly dependent on the molecular weight. In general, the higher the molecular weight the higher the general mechanical properties, such as tensile strength, flexural modulus, impact strength, and yield elongation.

These polyesters are typically prepared using a catalyst. A number of catalysts, such as titanium and antimony, are known in the art to improve the rate of melt polymerization. Even though these catalysts are effective in enhancing the rate of polymerization there are several problems associated with use of these catalysts. One problem is that the rate of polymerization could be improved. Another problem is that the selectivity could be improved. Still another problem is that degradation reactions typically occur simultaneously with the condensation reaction and therefore the use of more active catalysts does not result in higher molecular weights and often has a deleterious effect on the polymer properties.

A number of approaches have been developed to overcome the problem of competing deleterious reactions. One approach is to conduct the polymerization in a solid state at relatively lower temperatures. Another approach is to incorporate chemical species, such as multifunctional epoxides or aromatic carbonates, with the polymerization reactants. These chemical species preferentially react with the polymer chain ends and reduce deleterious reactions while not interfering with the polymerization reaction. Even though some of these approaches are somewhat effective all of these approaches suffer from various drawbacks. The use of multifunctional epoxides results in undesirable chain branching. The use of aromatic carbonates, such as diphenyl carbonate, results in the polymer containing volatile phenol, which is highly undesirable due to its toxicity.

Thus, there exists a need for a process to produce high molecular weight polyesters which will not result in branching and does not result in the polymer containing volatile, toxic materials. Furthermore, there is a need for a process to rapidly increase the molecular weight of polyesters which involves a minimum of processing steps and does not entail handling toxic reactants. Furthermore, there is the need for a process which employs catalysts which exhibit good activity and selectivity.

We have now discovered that a catalyst comprised of a combination of a 13X zeolites and a titanium alkoxide can be used to melt polymerize polyesters. This process results in a substantial increase in the rate of molecular weight buildup and without significant branching. Additionally, this process does not involve the use of toxic reactants.

The process of this invention can broadly be thought of as comprised of two steps. The first step is to prepare an admixture of a molten polyester having an inherent viscosity of less than 0.5, a titanium alkoxide and a 13X zeolite. A high molecular weight polyester is then prepared by subjecting the admixture to a time and temperature sufficient to increase the inherent viscosity of the polyester to at least 0.5.

A wide variety of polyesters are useful in this invention. Polyesters derived from aliphatic dicarboxylic acids can be used. In this embodiment the dicarboxylic acid can contain from 2 to 20, preferably from 2 to 10, carbon atoms. Examples of aliphatic dicarboxylic acids include oxalic acid, succinic acid, adipic acid, sebacic acid, dodecanedioic acid, glutaric acid, and cyclohexanedicarboxylic acid. Most preferably the aliphatic dicarboxylic acid is adipic acid.

Polyesters derived from aromatic dicarboxylic acids can also be used in this invention. Preferably, the aromatic dicarboxylic acid is a benzene dicarboxylic acid or a naphthalene dicarboxlic acid. More preferably, the benzene dicarboxylic acid in terephthalic acid and the naphthalene dicarboxlic acid is 2,6-naphthalene dicarboxylic acid.

The polyesters useful in this invention can be derived from aliphatic and cycloaliphatic diols. The aliphatic diols can contain from 2 to 10, preferably 2 to 4, carbon atoms. Examples of suitable aliphatic diols include ethylene glycol, 1,4-butane diol, 1,6-hexanediol, propylene glycol, and neopentyl glycol. Ethylene glycol and 1,4-butane diol are preferred. Examples of suitable cycloaliphatic diols include, 1,4-cyclohexanedimethanol, 2,6-decalindimethanol, and 1,3-cyclohexanedimethanol. Preferably the cycloaliphatic diol is 1,4-cycolhexanedimethanol.

Particularly preferred polyesters include poly(ethylene terephthalate), poly(butylene terephthalate), poly(dimethylenecyclohexylene terephthalate), poly(ethylene naphthalate) and poly(butylene adipate). Poly(ethylene terephthalate) is particularly preferred.

The 13X zeolite used in this invention is a faujasite well known in the art. The 13x zeolite as prepared contains sodium as a cation. This cation can be partially or completely exchanged for other alkali metal cations in accordance with methods well known in the art. Preferably the cation is sodium.

The amount of 13X zeolite useful in this invention can very widely depending on the particular polyester, the particular titanium alkoxide, the particular processing equipment being used and a wide variety of other factors. Typically, the amount of zeolite necessary to cause a significant increase in the polyester polymerization rate is in the range of 0.5 to 25 weight percent, based on the weight of the polyester. More preferably the amount is in the range of 0.5 to 15 weight percent, based on the weight of the polyester.

The size of the zeolite particle can vary widely depending on a number of factors, but is generally in the range of 0.1 to 10 microns, preferably 0.5 to 5 microns.

Titanium alkoxide catalysts which are useful in the present invention include titanium tetralkoxide compounds wherein the alkyl component contains from 1 to 6, preferably 2 to 4, carbon atoms. Examples of suitable titanium tetraalkoxide compounds include titanium tetramethoxide, titanium tetraethoxide, titanium tetrapropoxide, titanium tetraisopropoxide, titanium tetrabutoxide. Titanium chelates such as the bisacetylacetonate, the lactate and the citrate salts can be used. The preferred compound is titanium tetraisopropoxide.

As described earlier, the first step of the process of this invention involves preparing an admixture of the titanium alkoxide, a 13X zeolite and a molten polyester having an inherent viscosity of less than 0.5. By the term "molten polyester having an inherent viscosity of less than 0.5" we mean that the polyester can contain any number of repeating polyester units and can include very low molecular weight materials commonly referred to as oligomers. Also included within the meaning of this term is the use of the esterification product of two moles of diol and one mole of dicarboxylic acid. For example, in a preferred embodiment of the invention the polyester having an inherent viscosity of less than 0.5 is bis(hydroxyethyl)terephthalate. Thus, included within this term are polyesters which have a sufficiently high molecular weight to be solids at room temperature and must be melted to form the required molten state. Also included within this term are oligomers which are fluids at normal temperatures as well as polyesters which are the esterification product of two moles of diol and one mole of dicarboxylic acid and which are always fluids at normal temperatures.

The admixture of the molten polyester, the titanium alkoxide and the 13X zeolite can be prepared by methods well known in the art. For example, when the esterification product of two moles of diol and one mole of dicarboxylic acid is used as the polyester this material will normally be a liquid and the admixture can be prepared by stirring the titanium alkoxide and the 13X zeolite into the liquid. When the polyester is an oligomer which is a liquid the same technique can be used. When the polyester has sufficiently high molecular weight to be a solid the admixture can be prepared by combining the polyester, the zeolite and the titanium alkoxide and heating to obtain a molten state. The order of additions of reactant, catalysts, or heat is not critical. Preferably the polyester is the esterification product of two moles of diol and one mole of dicarboxylic acid and the admixture is preferably prepared by stirring the titanium alkoxide and the 13X zeolite into the liquid.

As described previously, the second step of the process of this invention is subjecting the admixture to a time and temperature sufficient to increase the inherent viscosity of the polyester to at least 0.5. This step can be preformed by methods well known in the art. For example, when the esterification product of two moles of diol and one mole of dicarboxylic acid is used as the polyester the admixture will normally be a liquid and the molecular weight of the polyester can be increased by subjecting the liquid admixture to increased temperatures and reduced pressures in accordance with techniques well known in the art. When the polyester is an oligomer which is a liquid the same technique can be used. When the polyester has sufficiently high molecular weight to be a solid the admixture will be at elevated temperatures in order to melt the polyester and the molecular weight be increased using the same technique but starting at a temperature which is initially higher.

In this invention the rapid increase in the molecular weight of the polyester is thought to be the result of a synergistic effect between the 13X zeolite and the titanium alkoxide. For example, the combination of a titanium alkoxide and other zeolites having similar compositions or the combination of a 13X zeolite and an organometallic compound other than a titanium alkoxide does not result in the enhanced rate of polymerization and other desirable results of the process of this invention.

In this invention the inherent viscosity of the polyester is increased in the second step to an inherent viscosity of at least 0.5, preferably 0.6.

The combination of a 13X zeolite and a polyester has been disclosed in the art but the use of a combination of a 13X zeolite and a titanium tetraalkoxide to obtain rapid increases in polyester molecular weight has not been disclosed in the art. For example, U.S. Pat. No. 3,876,608 discloses the addition of 13X or 4A zeolite in polyester as an inert filler to increase surface roughness. U.S. Pat. No. 4,282,137 discloses the use of zeolites to deliver inert gas into a polyester matrix to improve dyability. U.S. Pat. No. 4,391,971 discloses contacting molten polyester through a bed of zeolite pellets in order to remove contained acetaldehyde. This reference discloses in Table 2 that contacting a polyester with a 13X zeolite does not affect the molecular weight of the polyester. U.S. Pat. No. 3,066,116 discloses the use of zeolites to aid in driving polycondensation reactions to a higher degree of completion. DD 98,692 discloses the use of di- and trivalent cation containing A type zeolite to obtain high molecular weight polyesters.

In this invention the inherent viscosity of the polyester is measured in 0.5 weight percent solution of the polymer at 30° C. in a solvent composed of 60% by weight of phenol and 40% by weight of tetrachloroethane.

In the following examples the practice of the present invention is further described. It is understood that these examples do not limit the scope of this invention.

EXAMPLES

In example 1 the process of the invention was practiced by first stirring titanium tetraisopropoxide and 13X zeolite into the bis(hydroxyethyl)terephthalate to form an admixture. In the second step the admixture was subjected to polymerization conditions of 280° C. for one hour at 1.0 torr vacuum. In examples 2-5 the same procedure was followed except that only titanium isopropoxide was used in example 2 and only 13X zeolite was used in example 3. The results are tabulated below:

TABLE 1

| Example number | ppm Ti | wt % 13X | final IV |
|---|---|---|---|
| 1 | 30 | 5 | 1.074 |
| 2 | 30 | 0 | 0.678 |
| 3 | 0 | 5 | 0.229 |

As can be observed in the above table, the inherent viscosity of the polyester achieved a value of 1.074 in example 1 illustrating practice of the invention. In distinction, when only titanium isopropoxide was used in example 2 the value of inherent viscosity was only 0.678. Similarly, when only 13X zeolite was used in example 3 the value of inherent viscosity was only 0.229.

We claim:

1. A process for preparing a polyester having an inherent viscosity of at least 0.5 comprising
    (A) preparing an admixture of a molten polyester having an inherent viscosity of less than 0.5, a titanium alkoxide and a 13X zeolite, and
    (B) subjecting the admixture to a time and temperature sufficient to increase the inherent viscosity of the polyester to at least 0.5.

2. The process of claim 1 wherein the polyester is derived from terephthalic acid and a diol selected from the group consisting of ethylene glycol, 1,4-butane diol and 1,4-cyclohexanedimethanol.

3. The process of claim 1 wherein the amount of zeolite in is the range of 0.5 to 25 weight percent, based on the weight of the polyester.

4. The process of claim 1 wherein the particle size of the zeolite is in the range of 0.1 to 10 microns.

5. The process of claim 1 wherein the titanium alkoxide is titanium tetraisopropoxide.

6. A process for preparing a poly(ethylene terephthalate) having an inherent viscosity of at least 0.6 comprising
(A) preparing an admixture of a molten poly(ethylene terephthalate) having an inherent viscosity of less than 0.5, from 0.5 to 15 weight percent, based on the weight of the poly(ethylene terephthalate), of a 13X zeolite which has a particle size in the range of 0.5 to 5 microns and titanium tetraisopropoxide, and
(B) subjecting the admixture to a temperature greater than 250° C. for a time sufficient to increase the inherent viscosity of the poly(ethylene terephthalate) to at least 0.6.

* * * * *